US012755876B2

(12) United States Patent
Abe et al.

(10) Patent No.: US 12,755,876 B2
(45) Date of Patent: Oct. 6, 2026

(54) MANUFACTURING METHOD FOR LAMINATED CERAMIC COMPONENT

(71) Applicant: Panasonic Intellectual Property Management Co., Ltd., Osaka (JP)

(72) Inventors: Yuuichi Abe, Hokkaido (JP); Mikinori Amisawa, Hokkaido (JP); Kazuhiko Kubo, Hokkaido (JP); Yuji Yamagishi, Hokkaido (JP); Masashi Takamura, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 38 days.

(21) Appl. No.: 19/004,054

(22) Filed: Dec. 27, 2024

(65) Prior Publication Data

US 2025/0239387 A1 Jul. 24, 2025

(30) Foreign Application Priority Data

Jan. 24, 2024 (JP) ................................ 2024-008885

(51) Int. Cl.
*H01C 17/30* (2006.01)
*H01C 7/12* (2006.01)
*H01C 17/28* (2006.01)

(52) U.S. Cl.
CPC ........... *H01C 17/30* (2013.01); *H01C 17/281* (2013.01); *H01C 7/12* (2013.01)

(58) Field of Classification Search
CPC ........ H01C 17/30; H01C 17/281; H01C 7/12; H01C 7/18; H01C 17/00; H01G 4/012; H01G 4/232; H01G 4/30; H01G 4/306
See application file for complete search history.

(56) References Cited

U.S. PATENT DOCUMENTS

| | | | | |
|---|---|---|---|---|
| 2004/0195734 | A1* | 10/2004 | Teraura | C04B 35/62625 264/617 |
| 2017/0069428 | A1 | 3/2017 | Shimizu | |
| 2017/0076870 | A1* | 3/2017 | Noda | H01G 4/232 |
| 2017/0306489 | A1* | 10/2017 | Miyazaki | H01G 13/006 |
| 2019/0148075 | A1 | 5/2019 | Nakamura et al. | |

(Continued)

FOREIGN PATENT DOCUMENTS

| | | |
|---|---|---|
| JP | 2017-050453 | 3/2017 |
| JP | 2017-191880 | 10/2017 |
| JP | 2019-091800 | 6/2019 |

*Primary Examiner* — Michael A Tolin
*Assistant Examiner* — Christopher C Caillouet
(74) *Attorney, Agent, or Firm* — RIMON P.C.

(57) ABSTRACT

To provide a manufacturing method for a laminated ceramic component capable of forming an external electrode with a suppressed moon shape. The manufacturing method for the laminated ceramic component includes a first step, a second step, a third step, a fourth step, and a fifth step. In the first step, a laminate that a plurality of ceramic green sheets and a plurality of internal electrode paste layers are laminated is prepared. In the second step, the laminate is fired to form a ceramic element body. In the third step, plasma treatment is performed on a surface of the ceramic element body. In the fourth step, an external electrode paste is attached to a part of the surface of the ceramic element body after the third step. In the fifth step, the ceramic element body after the fourth step is subjected to the heat treatment to form an external electrode.

9 Claims, 3 Drawing Sheets

(56) References Cited

U.S. PATENT DOCUMENTS

| | | | | |
|---|---|---|---|---|
| 2023/0187139 A1* | 6/2023 | Byun | ..................... | H01G 4/224 |
| | | | | 361/301.4 |
| 2024/0212935 A1* | 6/2024 | Okada | .................... | H01G 4/232 |

* cited by examiner

MANUFACTURING METHOD FOR LAMINATED CERAMIC COMPONENT

BACKGROUND

1. Technical Field

The present disclosure relates to a manufacturing method for a laminated ceramic component. Specifically, the present disclosure relates to a manufacturing method for a laminated ceramic component, the method including a step of forming an external electrode on a surface of a ceramic element body.

2. Background

A laminated varistor is used for the purposes of protecting various electronic apparatuses, electronic devices, and the like from abnormal voltages due to lightning surges, static electricity, and the like, and preventing malfunctions of electronic apparatuses, electronic devices, and the like due to noise generated in a circuit, and other purposes.

In such a laminated ceramic component such as a laminated varistor, an external electrode paste is applied onto a ceramic element body having hydrophilicity and then baked to form an external electrode.

The external electrode paste is applied by immersing one end surface of the ceramic element body in the external electrode paste or by other processing. However, since the ceramic element body has hydrophilicity, the ceramic element body wets and spreads while being immersed in the external electrode paste. Therefore, the shape of the external electrode to be formed is a moon shape. As a result, there is the problem that the variation in the dimension of the external electrode increases, or it is difficult to match the dimension of the external electrode with a predetermined dimension value.

PTL 1 describes a manufacturing method for a ceramic electronic component including a step of forming, in a ceramic main body having a substantially rectangular parallelepiped shape in which a conductive metal layer is provided inside and a part of the conductive metal layer is extended to two opposing end surfaces, a pair of external electrodes in which a distance between side end portions on the side surfaces is shorter than a distance between central portions from the two opposing end surfaces to at least one side surface of the ceramic main body. In this manufacturing method, by immersing the laminated chip in a treatment liquid such as a silicon-based release agent or a fluorine-based release agent which has been formed into a bath at a desired concentration, then subjecting the laminated chip to dehydration and heat treatment, and then applying an external electrode paste, the moon shape of the external electrode is suppressed, and as described above, the distance between the side end portions of the pair of external electrodes can be made shorter than the interval between the central portions.

CITATION LIST

Patent Literature

PTL 1: Unexamined Japanese Patent Publication No. 2019-91800

SUMMARY

Problem to be Solved by the Invention

However, the method using the release agent as in PTL 1 has a step of immersing in a liquid, and a drying step is essential, so that there is the problem that the manufacturing step becomes complicated. In the production of the laminated varistor, an external electrode may be formed on an insulating layer having higher hydrophilicity on the surface of the ceramic element body.

An object of the present disclosure is to provide a manufacturing method for a laminated ceramic component capable of forming an external electrode with a suppressed moon shape.

Solution to Problem

A manufacturing method for a laminated ceramic component according to an aspect of the present disclosure includes a first step, a second step, a third step, a fourth step, and a fifth step. The first step is a step of preparing a laminate in which a plurality of ceramic green sheets and a plurality of internal electrode paste layers are laminated. The second step is a step of firing the laminate to form a ceramic element body. The third step is a step of performing plasma treatment on a surface of the ceramic element body. The fourth step is a step of attaching an external electrode paste to a part of the surface of the ceramic element body after the third step. The fifth step is a step of subjecting the ceramic element body after the fourth step to heat treatment to form an external electrode.

Advantageous Effect of Invention

According to the present disclosure, by suppressing the wet-spreading of the external electrode paste by a simple method, it is possible to form an external electrode with a suppressed moon shape, thereby facilitating control of the application dimensions of the external electrode.

DETAILED DESCRIPTIONS

1. Overview

Hereinafter, a manufacturing method for a laminated ceramic component according to according to one exemplary embodiment of the present disclosure will be described with reference to the drawings. Note that the drawings described in the following exemplary embodiments are schematic views, and the ratio of the size and the thickness of each component in each drawing does not necessarily reflect the actual dimensional ratio.

Laminated ceramic component 1 manufactured by the manufacturing method of the present exemplary embodiment includes ceramic element body 11, a plurality of internal electrodes 12, and a plurality of external electrodes 14, and examples thereof include a laminated varistor, a laminated thermistor, and a laminated ceramic capacitor.

In laminated ceramic component 1, ceramic element body 11 has end surfaces S11, S12 facing each other in a first direction (X direction), side surfaces S21, S22 facing each other in a second direction (Y direction) intersecting the first direction (X direction), and principal surfaces S31, S32 facing each other in a third direction (Z direction) intersecting the first direction (X direction) and the second direction (Y direction).

Figure 1A:
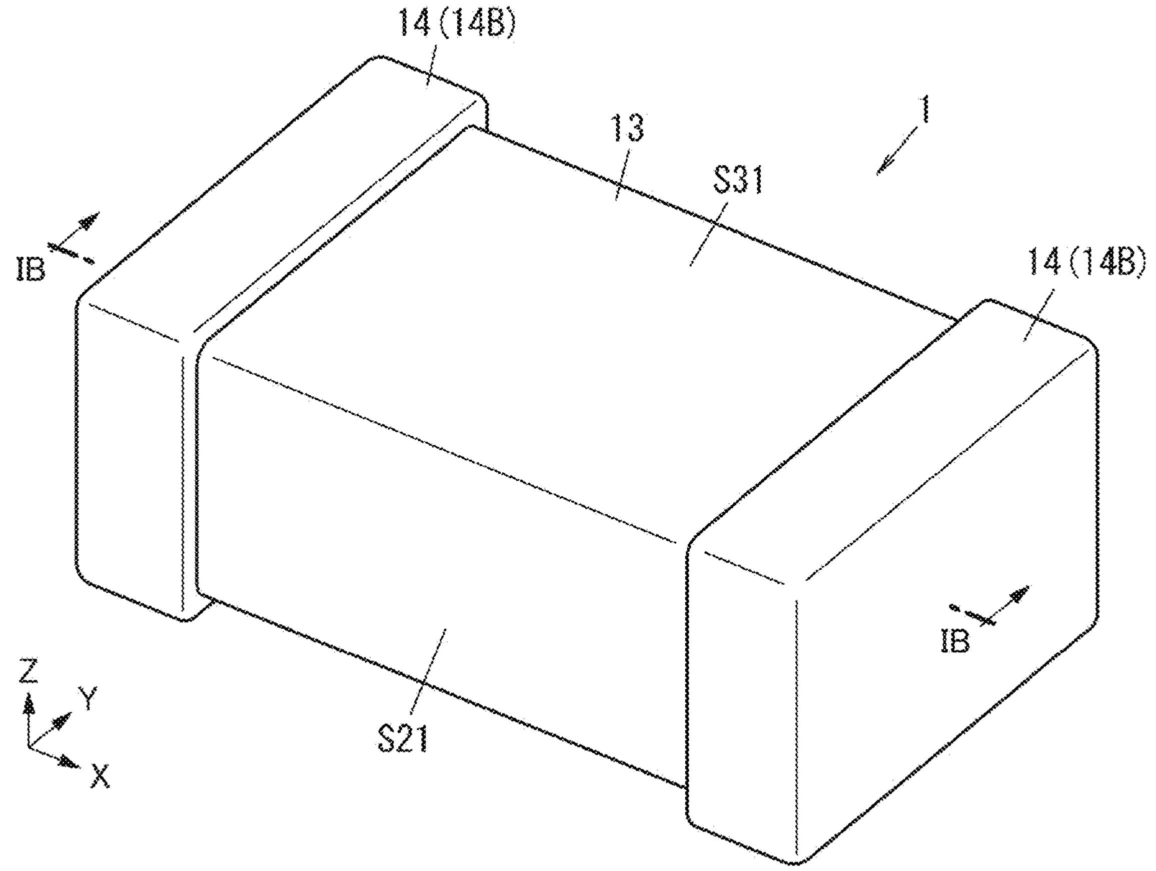
FIG. 1A is a schematic perspective view in an example of a laminated ceramic component manufactured by the manufacturing method for the present disclosure.
Figure 1B:
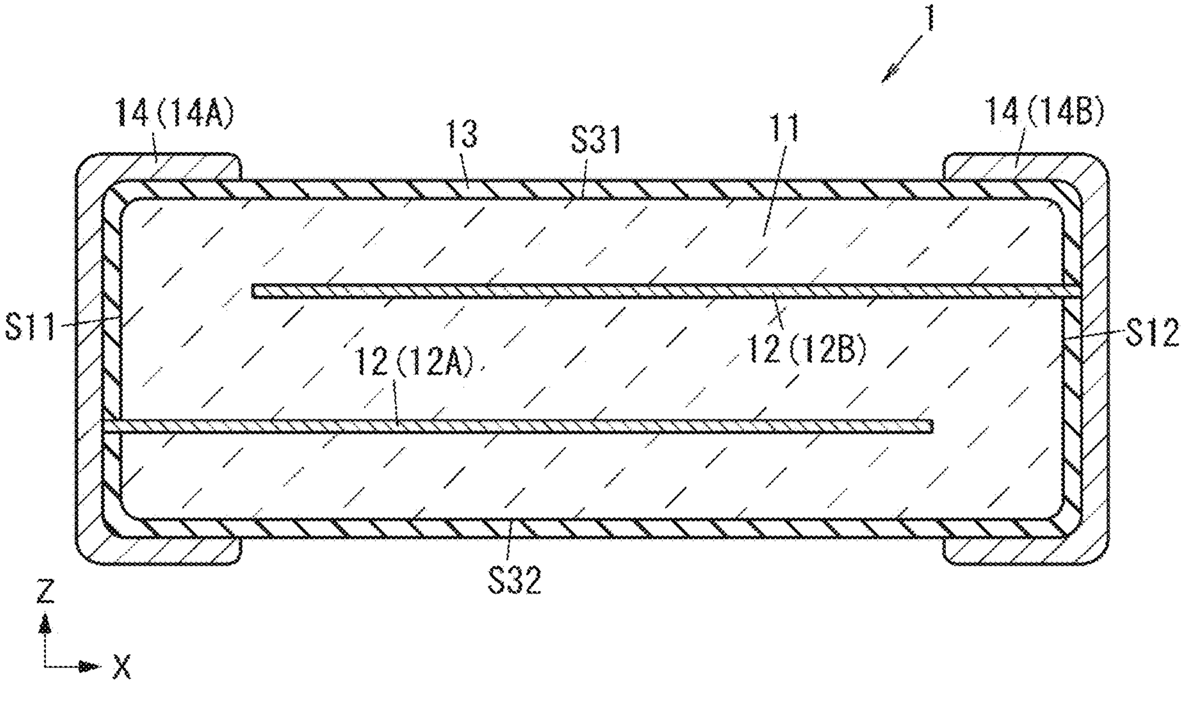
FIG. 1B is a sectional view along line IB-IB of a laminated ceramic component manufactured by the manufacturing method for the present disclosure.

FIGS. 1A and 1B are views in an example of laminated ceramic component 1 manufactured by the manufacturing method of the present exemplary embodiment. FIG. 1A is a schematic perspective view in an example of laminated ceramic component 1 manufactured by the manufacturing method of the present exemplary embodiment. FIG. 1B is a sectional view along line IB-IB of laminated ceramic component 1 manufactured by the manufacturing method for the present disclosure. As shown in FIG. 1A, in laminated ceramic component 1, external electrodes 14 (14A, 14B) formed on all of principal surfaces S31 and S32 and some of side surfaces S21 and S22 each have a substantially rectangular shape in plan view. As shown in FIG. 1B, laminated ceramic component 1 includes ceramic element body 11, a pair of internal electrodes 12A and 12B, insulating layer 13, and a pair of external electrodes 14A and 14B.

Figure 2A:
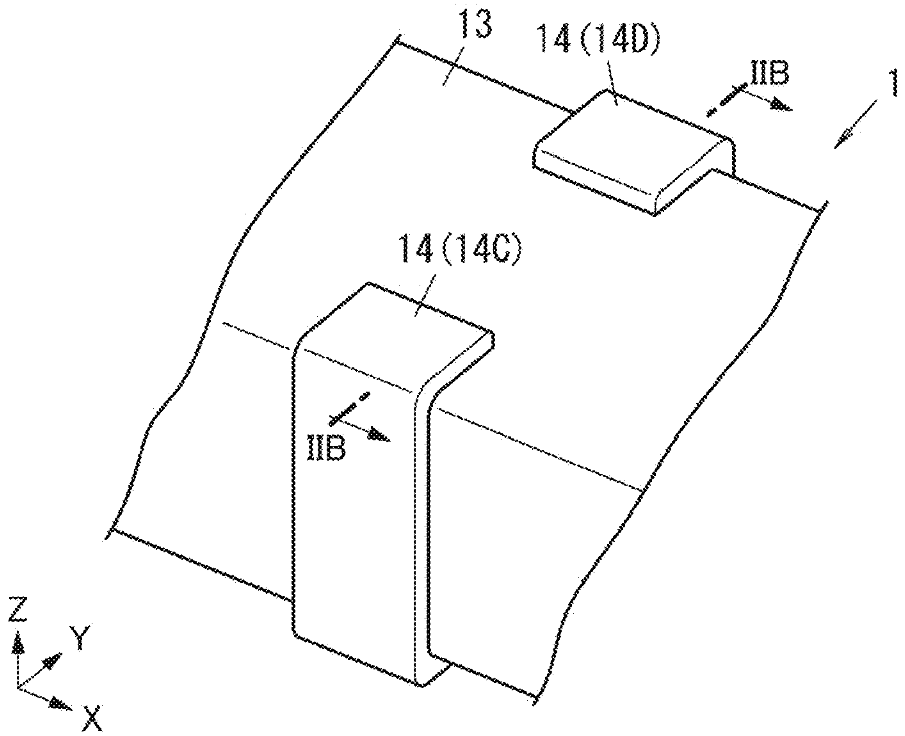
FIG. 2A is a schematic partial perspective view in an example of a laminated ceramic component manufactured by the manufacturing method for the present disclosure.
Figure 2B:
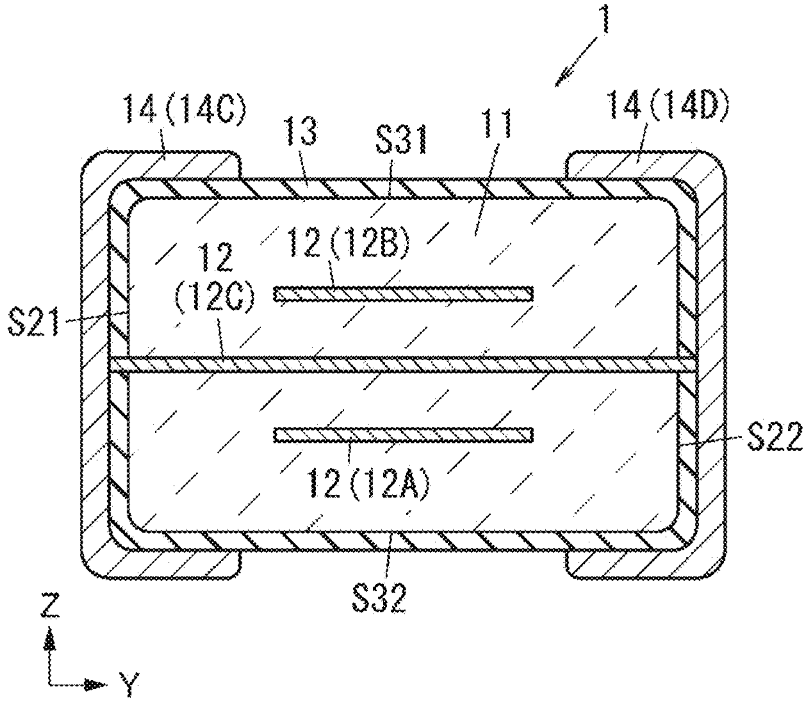
FIG. 2B is a sectional view along line IIB-IIB of the laminated ceramic component manufactured by the manufacturing method for the present disclosure.

In addition, FIGS. 2A and 2B are views in an example of laminated ceramic component 1 manufactured by the manufacturing method of the present exemplary embodiment. FIG. 2A is a schematic partial perspective view in an example of laminated ceramic component 1 manufactured by the manufacturing method for the present disclosure. FIG. 2B is a sectional view along line IIB-IIB of laminated ceramic component 1 manufactured by the manufacturing method for the present disclosure. In laminated ceramic component 1 of FIG. 2A, external electrodes (14C, 14D) formed on the partial surfaces of side surfaces S21 and S22 and the partial surfaces of principal surfaces S31 and S32 each have a substantially rectangular shape in plan view. As shown in FIG. 2B, laminated ceramic component 1 includes ceramic element body 11, three internal electrodes 12A, 12B, 12C, insulating layer 13, and two pairs of external electrodes 14A, 14B, 14C, 14D.

As shown in FIGS. 2A and 2B, external electrode 14 (14A, 14B, 14C, 14D) in laminated ceramic component 1 obtained by the manufacturing method of the present exemplary embodiment has a suppressed moon shape. According to the manufacturing method of the present exemplary embodiment, it is possible to form external electrode 14 with a suppressed moon shape on various surfaces such as end surfaces S11, S12, side surfaces S21, S22, and principal surfaces S31, S32 on ceramic element body 11 or insulating layer 13.

The manufacturing method for a laminated ceramic component according to the present exemplary embodiment includes a first step, a second step, a third step, a fourth step, and a fifth step. In the first step, a laminate that a plurality of ceramic green sheets and a plurality of internal electrode paste layers are laminated (hereinafter, also referred to as laminate L) is prepared. In the second step, laminate L is fired to form ceramic element body 11. In the third step, plasma treatment is performed on a surface of ceramic element body 11. In the fourth step, an external electrode paste is attached to a part of the surface of ceramic element body 11 after the third step. In the fifth step, heat treatment is performed on ceramic element body 11 after the fourth step to form an external electrode.

The inventors have extensively conducted studies for achieving the above-mentioned object, and have found that the shape of the external electrode can be controlled by subjecting the ceramic element body to a specific treatment, thereby completing the present disclosure. According to the manufacturing method for a laminated ceramic component according to the present exemplary embodiment, it is possible to form external electrode 14 with a suppressed moon shape in laminated ceramic component 1 by including the first to the fifth steps.

The reason why the manufacturing method for a laminated ceramic component according to the present exemplary embodiment exhibits the above effect by having the above configuration is considered to be, for example, that a contact angle can be changed or increased by performing plasma treatment on the surface of ceramic element body 11 or insulating layer 13 in the third step, and thus wet-spreading of the external electrode paste can be suppressed.

In the technique using the release agent of PTL 1 described above, not only a step of immersing in a liquid is included, and a drying step is essential, but also element body materials easily adhere to each other due to the adhesiveness of the release agent. For this reason, there is the problem that the manufacturing step becomes complicated such that measures are required. In addition, residues of the release agent may remain even after firing, which may affect the characteristics of the laminated ceramic component to be manufactured. In addition, in the technique of PTL 1, the distance between the side end portions of the pair of external electrodes can be made shorter than the distance between the central portions.

On the other hand, in the manufacturing method for a laminated ceramic component according to the present exemplary embodiment, the steps such as the plasma treatment is dry, and measures against adhesion between the element body materials or the like are unnecessary. It is therefore possible to simplify the manufacturing step. In addition, the change in the surface of the element body material due to the plasma treatment disappears during firing, and even if any change remains, it does not affect the characteristics of the laminated ceramic component to be manufactured. Furthermore, by adjusting conditions of plasma treatment, firing, and the like, there is an effect that the planar view shape of the external electrode can be made close to a rectangular shape, or other effect.

2. Details

Manufacturing Method for Laminated Ceramic Component

The manufacturing method for a laminated ceramic component according to the present exemplary embodiment (hereinafter, also referred to as manufacturing method (I)) includes the first step, the second step, the third step, the fourth step, and the fifth step.

Manufacturing method (I) may further include, after the second step and before the third step, a step of forming insulating layer 13 (hereinafter, also referred to as insulating layer forming process) on a surface of ceramic element body 11 after the second step. When manufacturing method (I) includes the insulating layer forming process, plasma treatment is performed on the surface of insulating layer 13 in the third step. Manufacturing method (I) has a great advantage of being adopted when insulating layer 13 having a surface having higher hydrophilicity than ceramic element body 11 is provided.

In addition, the manufacturing method of the present exemplary embodiment may further include, after the fifth step, a step of forming a plating electrode (hereinafter, also referred to as plating electrode forming process) so as to cover external electrode 14 after the fifth step.

Hereinafter, each step will be described by taking as an example a case where laminated ceramic component 1 is laminated varistor 1.

First Step

In the first step, a laminate that a plurality of ceramic green sheets and a plurality of internal electrode paste layers are laminated is prepared.

The ceramic green sheet contains, for example, a ceramic component, a binder component, and the like. The ceramic component usually contains at least zinc oxide (ZnO), and may further contain $Pr_6O_{11}$, $Co_2O_3$, CaO, $Bi_2O_3$, and the like. Examples of the binder component include polyvinyl alcohol, polyvinyl butyral, and ethyl cellulose.

The ceramic green sheet can be produced, for example, by preparing a slurry containing a powder of a ceramic component and an organic component such as a binder component and a solvent, and molding the slurry using a coating machine or the like. The thickness of the ceramic green sheet is, for example, 20 μm or more and 50 μm or less.

The internal electrode paste layer contains, for example, a metal powder. Examples of the metal powder include Pd powder and PdAg powder.

Laminate L is obtained by laminating the plurality of the ceramic green sheets and the plurality of the internal electrode paste layers in the third direction (Z direction).

[Second step] In the second step, laminate L is fired to form ceramic element body 11. Specifically, laminate L is cut in the first direction (X direction) and the second direction (Y direction) to obtain a plurality of green bodies (hereinafter, also referred to as green body G) in which a part of the internal electrode paste layer is exposed at the exposed surface, and then green bodies G are fired to form a plurality of ceramic element bodies 11. The shape of green body G is usually a rectangular parallelepiped. Green body G may have rounded corners.

Laminate L is fired, for example, by heating green body G. The heating temperature is, for example, less than or equal to 1300° C. Examples of the heating atmosphere include under an air atmosphere and under an inert gas atmosphere. By this firing, the binder component and the like contained in green body G are thermally decomposed, and then the ceramic material is sintered to obtain the plurality of ceramic element bodies 11.

Ceramic element body 11 obtained in the second step includes the plurality of internal electrodes 12 therein.

[Insulating layer forming process] In the insulating layer forming process, insulating layer 13 is formed on a surface of ceramic element body 11 after the second step. For example, a precursor solution containing a glass component is deposited on the surface of ceramic element body 11 obtained in the second step, and then heat treatment is performed to form insulating layer 13 on the surface of ceramic element body 11.

The "glass component" means an amorphous substance and means a substance having a softening point. The "softening point" means a temperature at which the glass component starts to deform due to temperature rise. Examples of the glass component include zinc borosilicate glass. The precursor solution may contain, for example, a binder component such as ethyl cellulose, an organic component such as a solvent, and the like in addition to the glass component. The softening point of the glass component is, for example, more than or equal to 300° C. and less than or equal to 500° C.

Insulating layer 13 may be formed on a part of the surface of ceramic element body 11, or may be formed on the entire surface of ceramic element body 11.

Third Step

In the third step, the plasma treatment is performed on a surface of ceramic element body 11. When the insulating layer forming process is performed after the second step, after the third step, plasma treatment is performed on the surface of insulating layer 13.

The plasma treatment can be performed using, for example, plasma treatment apparatus or the like. The plasma may be atmospheric pressure plasma or vacuum plasma.

Examples of the gas used for the plasma treatment include hydrocarbon, carbon fluoride, fluorine, oxygen, air, hydrogen, and an inert gas.

Examples of the hydrocarbon include methane, and examples of the carbon fluoride include $C_nF_m$ (n and m are natural numbers) and $CF_4$, $C_2F_4$, $C_3F_6$, $C_4F_8$, and $C_4F_{10}$.

Examples of the inert gas include argon, nitrogen, and the like.

As the gas used for the plasma treatment, carbon fluoride is preferred, and $C_4F_8$ is more preferred, from the viewpoint that the contact angle of the surface of ceramic element body 11 or insulating layer 13 can be more easily increased.

The time of the plasma treatment is, for example, 5 seconds or more, more preferably 10 seconds or more, still more preferably 20 seconds or more, further more preferably 45 seconds or more, and particularly preferably 75 seconds or more. The upper limit of the time for the plasma treatment is not particularly limited, but is, for example, 5 minutes or less, preferably 2 minutes or less.

The plasma treatment may be performed on a part of the surface of ceramic element body 11 or insulating layer 13, or may be performed on the entire surface of ceramic element body 11 or insulating layer 13.

Before the plasma treatment, on the surface of ceramic element body 11 or insulating layer 13, pre-cleaning treatment may be performed. This pre-cleaning treatment can be performed by, for example, argon plasma treatment for about 30 seconds.

The surface of ceramic element body 11 or insulating layer 13 after the third step is preferably hydrophobized by the plasma treatment. The "hydrophobized" means that the contact angle of water on the surface of ceramic element body 11 or insulating layer 13 is increased after the plasma treatment (thereinafter, also referred to as contact angle after plasma treatment) than before the plasma treatment (hereinafter, also referred to as contact angle before plasma treatment).

A contact angle increase value (=contact angle after plasma treatment−contact angle before plasma treatment) before and after the plasma treatment is, for example, 60° or more, preferably 65° or more, more preferably 70° or more, and still more preferably 75° or more. An upper limit of the contact angle increase value is not particularly limited, but is, for example, 90° or less.

The contact angle after plasma treatment is, for example, 100° or more, more preferably 105° or more, still more preferably 110° or more, further more preferably 113° or more, and particularly preferably 115° or more. The upper limit of the contact angle after plasma treatment is not particularly limited, but is, for example, 130° or less, preferably 120° or less.

Fourth Step

In the fourth step, an external electrode paste is attached to a part of the surface of ceramic element body 11 after the third step. When the insulating layer forming process is performed after the second step, the external electrode paste is attached to a part of the surface of insulating layer 13 after the third step in the fourth step. According to manufacturing method (I), the wet-spreading of the external electrode paste can be suppressed in the fourth step.

The external electrode paste contains a metal powder. Examples of the metal powder include Ag powder, AgPd powder, and AgPt powder. The external electrode paste may further contain, for example, a glass component such as $Bi_2O_3$, $SiO_2$, or $B_2O_3$, a resin component, a solvent, or any other component.

Examples of the method for attaching the external electrode paste include a dipping method in which ceramic element body 11 or insulating layer 13 is dipped in the external electrode paste in a container, and a roller transfer method in which the external electrode paste attached to a convex plate is applied by pressing the external electrode paste against ceramic element body 11 or insulating layer 13.

In ceramic element body 11 or insulating layer 13, a portion to which the external electrode paste is attached is not particularly limited, and may be on end surfaces S11, S12, side surfaces S21, S22, or principal surfaces S31, S32.

As described above, manufacturing method (I) can be applied to both the formation of end surface external electrodes 14A, 14B and the formation of side surface external electrodes 14 C, 14D.

Fifth Step

In the fifth step, ceramic element body 11 after the fourth step is subjected to heat treatment to form external electrode 14. When the insulating layer forming process is performed after the second step, insulating layer 13 after the fourth step is subjected to heat treatment to form external electrode 14 in the fifth step. According to manufacturing method (I), in the fifth step, fluorine atoms bonded or attached to ceramic element body 11 or insulating layer 13 can be removed by the heat treatment.

Specifically, the heat treatment is performed by heating the external electrode paste. The heating temperature is, for example, more than or equal to 700° C. and less than or equal to 800° C.

It is preferable that, out of the surface of ceramic element body 11 after the fifth step, no fluorine atom is present on a surface layer of a portion where external electrode 14 is not disposed. When the insulating layer forming process is performed after the second step, it is preferable that, out of the surface of insulating layer 13 after the fifth step, no fluorine atom is present on a surface layer in the case where external electrode 14 is not disposed. Since no fluorine atom is present on the surface layer of ceramic element body 11 or insulating layer 13, there is no inconvenience due to buoyancy or the like of an object to be plated in a plating electrode forming process described later, and plating operation can be performed satisfactorily.

The meaning of "no fluorine atom is present on the surface layer" includes the fact that substantially no fluorine atoms are present. The "surface layer" refers to a region usually within 10 nm from the surface, and this distance corresponds to a detection depth of X-ray fluorescence (XRF). The "substantially no fluorine atom is present" means that the concentration of fluorine atoms is less than the lower detection limit of XRF analysis.

Figure 3:
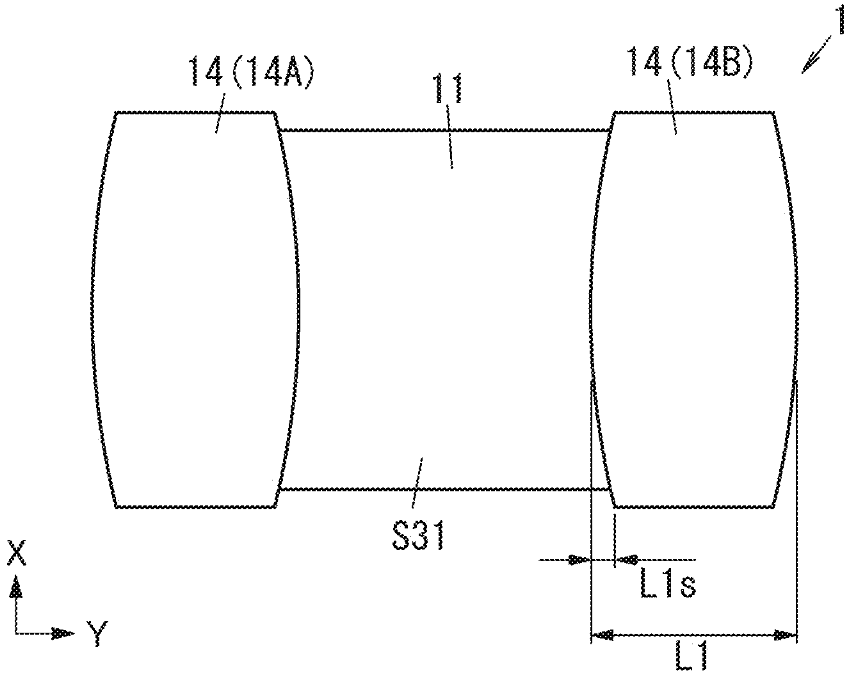
FIG. 3 is a schematic top view showing a moon shape of an external electrode in the laminated ceramic component.

FIG. 3 is a view showing a moon shape of external electrode 14 (14A, 14B) formed on a part of principal surface S31 of ceramic element body 11 in laminated ceramic component 1. In FIG. 3, L1 is the maximum length in the second direction (Y direction) of external electrode 14B having a moon shape (length in the second direction (Y direction) at the central portion in the first direction (X direction) of external electrode 14B), and L1*s* is the minimum length in the second direction (Y direction) of external electrode 14B (length in the second direction (Y direction) at both ends in the first direction (X direction) of external electrode 14B).

In external electrode 14 in laminated ceramic component 1 after the fifth step, the value of (L1-L1*s*) (hereinafter, also referred to as moon shape difference M) is a numerical value indicating the degree of the moon shape of external electrode 14.

The measured values of moon shape difference M (arithmetic mean value at 10 arbitrary points) and contact angle N of water on the surface in laminated ceramic component 1 after the fifth step according to manufacturing method (I) were (M: 0.060, N: 38°) when the plasma treatment was not performed, whereas the measured values were plasma treatment time: 15 seconds (M: 0.021, N: 108°), 30 seconds (M: 0.026, N: 108°), 60 seconds (M: 0.021, N: 115°), and 90 seconds (M: 0.019, 118°) when the plasma treatment was performed in the presence of carbon fluoride.

As described above, according to manufacturing method (I), the moon shape of external electrode 14 (14A, 14B, 14 C, 14D) of laminated ceramic component 1 can be suppressed. This facilitates control of the application dimension of external electrode 14.

In manufacturing method (I), the fourth step and the fifth step may be repeated to form a secondary external electrode as external electrode 14 in addition to the primary external electrode.

Plating Electrode Forming Process

In the plating electrode forming process, a plating electrode is formed so as to cover external electrode 14.

The plating electrode can be formed, for example, by performing electrolytic plating or by sequentially performing Ni plating and Sn plating.

As described above, laminated varistor 1 including external electrode 14 with a suppressed moon shape, in which ceramic element body 11 contains zinc oxide as a main component, can be manufactured by manufacturing method (I). Manufacturing method (I) can also be suitably used for laminated varistor 1 that may have insulating layer 13 having a higher surface hydrophilicity.

In addition, similarly to the above-described laminated varistor 1, a laminated thermistor including external electrode 14 with a suppressed moon shape, a laminated ceramic capacitor, and the like can be manufactured by manufacturing method (I).

In the laminated thermistor, ceramic element body 11 contains, for example, Mn, Co, Fe, Al, Cu and the like, the internal electrode paste layer contains, for example, Pd or the like, and the external electrode paste contains, for example, Cu or the like.

In the laminated ceramic capacitor, ceramic element body 11 contains, for example, $BaTiO_3$, $CaZrO_3$, $CaTiO_3$, $SrTiO_3$, and the like as a main component and MgO, $Dy_2O_3$, $SiO_2$, $MnO_2$, and the like as an accessory component, the internal electrode paste layer contains, for example, Pt, Pd, Ag, Au, Ni, Cu, Sn, or the like, and the external electrode paste contains, for example, Cu, Ni, Al, Zn, Cu—Ni, and the like.

Conclusions

As apparent from the above exemplary embodiments, the present disclosure includes the following aspects. In the following, reference marks are given in parentheses only to clarify the correspondence relationship with the exemplary embodiment.

The manufacturing method for a laminated ceramic component according to a first aspect includes a first step, a second step, a third step, a fourth step, and a fifth step. In the first step, laminate (L) that a plurality of ceramic green sheets and a plurality of internal electrode paste layers are laminated is prepared. In the second step, laminate (L) is fired to form ceramic element body (11). In the third step, plasma treatment is performed on a surface of ceramic element body (11). In the fourth step, an external electrode paste is attached to a part of the surface of ceramic element body (11) after the third step. In the fifth step, ceramic element body (11) after the fourth step is subjected to heat treatment to form external electrode (14).

According to the first aspect, suppressing the wet-spreading of the external electrode paste makes it possible to provide laminated ceramic component (1) including external electrode (14) with a suppressed moon shape, thereby facilitating control of the application dimensions.

In the manufacturing method for a laminated ceramic component according to a second aspect, in the first aspect, the plasma treatment in the third step is performed in presence of carbon fluoride.

According to the second aspect, by the plasma treatment using carbon fluoride, the contact angle of the surface after the plasma treatment can be further increased, and the moon shape of external electrode (14) can be further suppressed.

In the manufacturing method for a laminated ceramic component according to a third aspect, in the first or the second aspect, the surface of ceramic element body (11) after the third step is hydrophobized by the plasma treatment.

According to the third aspect, since the surface is hydrophobized by the plasma treatment, the moon shape of external electrode (14) can be further suppressed.

In the manufacturing method for a laminated ceramic component according to a fourth aspect, out of the surface of ceramic element body (11) after the fifth step, in the second or the third aspect, no fluorine atom is present on a surface layer of a portion where external electrode (14) is not disposed.

According to the fourth aspect, since no fluorine atom is present on the surface layer, there is no inconvenience due to buoyancy or the like of an object to be plated in a plating electrode forming process described later, and plating operation can be performed satisfactorily.

In the manufacturing method for a laminated ceramic component according to the fifth aspect, in any one of the first to the fourth aspects, after the second step and before the third step, a step of forming insulating layer (13) on a surface of the ceramic element body after the second step is further included, and in the third step, plasma treatment is performed on the surface of insulating layer (13).

According to a fifth aspect, the manufacturing method for laminated ceramic component (1) of the present disclosure has a great advantage of being employed when including insulating layer (13) having a surface with higher hydrophilicity than ceramic element body (11).

In the manufacturing method for a laminated ceramic component according to a sixth aspect, in any one of the first to the fifth aspects, laminated ceramic component (1) is laminated varistor (1) that ceramic element body (11) contains zinc oxide as a main component.

According to the sixth aspect, the manufacturing method for laminated ceramic component (1) of the present disclosure can also be suitably used for laminated varistor (1) that may have insulating layer (13) having a higher surface hydrophilicity.

What is claimed is:

1. A manufacturing method for a laminated ceramic component, the manufacturing method comprising:

preparing a laminate in which a plurality of ceramic green sheets and a plurality of internal electrode paste layers are laminated;

firing the laminate to form a ceramic element body;

performing a plasma treatment on a surface of the ceramic element body;

attaching an external electrode paste to a part of the surface of the ceramic element body after performing the plasma treatment; and subjecting the ceramic element body after the fourth step attaching the external electrode paste to a heat treatment to form an external electrode, wherein the plasma treatment is performed in presence of carbon fluoride, and out of the surface of the ceramic element body after subjecting the ceramic element body to the heat treatment, no fluorine atom is present on a surface layer of a portion where the external electrode is not disposed.

2. The manufacturing method for the laminated ceramic component according to claim 1, wherein the surface of the ceramic element body after performing the plasma treatment is hydrophobized by the plasma treatment.

3. The manufacturing method for the laminated ceramic component according to claim 1, the manufacturing method further comprising, after firing the laminate and before performing the plasma treatment, forming an insulating layer on the surface of the ceramic element body, wherein, the plasma treatment is performed on a surface of the insulating layer.

4. The manufacturing method for the laminated ceramic component according to claim 3, wherein the laminated ceramic component is a laminated varistor that the ceramic element body contains zinc oxide as a main component.

5. A manufacturing method for a laminated ceramic component, the manufacturing method comprising:

preparing a laminate in which a plurality of ceramic green sheets and a plurality of internal electrode paste layers are laminated;

firing the laminate to form a ceramic element body;

forming an insulating layer on a surface of the ceramic element body;

performing a plasma treatment on the surface of the ceramic element body;

attaching an external electrode paste to a part of the surface of the ceramic element body after performing the plasma treatment; and subjecting the ceramic element body after attaching the external electrode paste to a heat treatment to form an external electrode, wherein the plasma treatment is performed on a surface of the insulating layer.

6. The manufacturing method for the laminated ceramic component according to claim 5, wherein the plasma treatment is performed in presence of carbon fluoride.

7. The manufacturing method for the laminated ceramic component according to claim 6, wherein, out of the surface of the ceramic element body after subjecting the ceramic element body to the heat treatment, no fluorine atom is present on a surface layer of a portion where the external electrode is not disposed.

8. The manufacturing method for the laminated ceramic component according to claim 5, wherein the surface of the ceramic element body after performing the plasma treatment is hydrophobized by the plasma treatment.

9. The manufacturing method for the laminated ceramic component according to claim 5, wherein the laminated ceramic component is a laminated varistor that the ceramic element body contains zinc oxide as a main component.

* * * * *